United States Patent
Wu et al.

(10) Patent No.: US 10,048,505 B2
(45) Date of Patent: Aug. 14, 2018

(54) GRATING, DISPLAY DEVICE, AND MANUFACTURING METHOD OF GRATING

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Xiaojuan Wu, Beijing (CN); Wei Li, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 15/037,482

(22) PCT Filed: Sep. 18, 2015

(86) PCT No.: PCT/CN2015/090000
§ 371 (c)(1),
(2) Date: May 18, 2016

(87) PCT Pub. No.: WO2016/150124
PCT Pub. Date: Sep. 29, 2016

(65) Prior Publication Data
US 2017/0108701 A1    Apr. 20, 2017

(30) Foreign Application Priority Data
Mar. 20, 2015  (CN) .......................... 2015 1 0125758

(51) Int. Cl.
*G02F 1/13* (2006.01)
*G02B 27/22* (2018.01)
*G02F 1/137* (2006.01)

(52) U.S. Cl.
CPC ..... *G02B 27/2214* (2013.01); *G02B 27/2228* (2013.01); *G02F 1/132* (2013.01); *G02F 1/13718* (2013.01)

(58) Field of Classification Search
CPC ........................................................ G02F 1/00
See application file for complete search history.

(56) References Cited

FOREIGN PATENT DOCUMENTS

| CN | 101382689 A | 3/2009 |
|---|---|---|
| CN | 101825800 A | 9/2010 |

(Continued)

OTHER PUBLICATIONS

First Korean Office Action dated Aug. 9, 2017.
(Continued)

*Primary Examiner* — Chanceity Robinson
(74) *Attorney, Agent, or Firm* — Dilworth & Barrese, LLP.; Michael J. Musella, Esq.

(57) ABSTRACT

A grating including a first substrate and a second substrate oppositely disposed; a first transparent electrode having a grating structure and disposed on a side of the first substrate facing towards the second substrate; a second transparent electrode disposed on a side of the second substrate facing towards the first substrate and disposed opposite to the first transparent electrode; and a polymer layer disposed between the first transparent electrode and the second transparent electrode and containing therein nano-sized material converting electromagnetic energy into heat energy and liquid crystalline elastomers. When a voltage is applied, the nano-sized material converts electromagnetic energy into heat energy, to convert the polymer layer to cholesterol phase and reflect all the light within the wavelength range of visible light; and when no voltage is applied, the polymer layer is transparent.

20 Claims, 6 Drawing Sheets

(56) References Cited

FOREIGN PATENT DOCUMENTS

| CN | 102643432 | A |   | 8/2012 |
|----|-----------|---|---|--------|
| CN | 102649907 | A |   | 8/2012 |
| CN | 102643432 | B | * | 7/2013 |
| CN | 103246072 | A | * | 8/2013 |
| CN | 103992445 | A |   | 8/2014 |
| EP | 1050775   | A1|   | 8/2000 |

OTHER PUBLICATIONS

International Preliminary Report on Patentability dated Sep. 26, 2017.
First Chinese Office Action dated Feb. 28, 2017.

* cited by examiner

GRATING, DISPLAY DEVICE, AND MANUFACTURING METHOD OF GRATING

TECHNICAL FIELD

Embodiments of the present disclosure relate to a grating, a display device and a manufacturing method of the grating.

BACKGROUND

In panel display devices, thin film transistor liquid crystal displays (abbreviated as TFT-LCDs) have characteristics of small volume, low power consumption, relatively low manufacturing cost and no radiation, and thus prevail in the current market of planar panel displays. Liquid crystal displays are more and more widely used in modern life. A liquid crystal display can be commonly used as a display screen for cell phone, a display screen for Note Book, a display screen for GPS or a display screen for liquid crystal television. With the development of science and technology, traditional displays for displaying planar images only cannot meet people's demand for the display quality. Three Dimension (abbreviated as 3D) displays, which have been widely studied in recent years, display images in a three dimensional manner so that the images are not limited to the plane of the screen, thereby the picture is more vivid and makes the viewer have an immersive feeling. 3D display devices are mainly classified into two types, i.e., glasses-wearing type and naked-eye type. 3D display devices of the glasses-wearing type require the viewer to wear a pair of particular 3D glasses, otherwise the images which are seen by the viewer on the 3D display devices are fuzzy images.

3D display devices of naked-eye type are convenient to use without wearing glasses and thus have been widely used. 3D display devices of naked-eye type can be classified into barrier fence type naked-eye 3D display devices and lens type naked-eye 3D display devices. Both types can achieve the switching between 2D mode and 3D mode by controlling whether a voltage is applied to the liquid crystal electrode and can ensure the left and right eyes of the human to respectively receive a correct image by controlling the magnitude of the voltage. The barrier fence type naked-eye 3D display device has been widely studied, because its manufacturing process is compatible with the process of a planar display screen such as a liquid crystal display screen or an organic light emitting screen. The barrier fence type 3D display device achieves 3D displaying through superposing a layer of Twisted Nematic (abbreviated as TN) type liquid crystal grating on the surface of the display panel on the light emitting side. Such three dimension display process is inexpensive and is developed well, and can achieve the switching between 2D mode and 3D mode. However, in the common barrier fence type 3D display device, the layer of liquid crystal grating superposed on the display panel usually has a thickness of about several ten millimeters, thereby the module is a relatively thick as a whole, while at the time of 2D display mode, light needs to pass through the liquid crystal layer and thus the light transmittance is low and the display effect is poor.

SUMMARY

At least one object of the embodiments of the present disclosure is to provide a grating, a display device having the grating and a manufacturing method of the grating. The grating is used together with the display panel to achieve naked-eye 3D display and to improve light transmittance during 2D display.

At least one embodiment of the present disclosure provides a grating, the grating comprising:

a first substrate and a second substrate which are oppositely arranged, the first substrate provided with a first transparent electrode having a grating structure on a side of the first substrate facing towards the second substrate, and the second substrate having a second transparent electrode which corresponds to the first transparent electrode on a side facing towards the first substrate; and a polymer layer which is disposed between the first transparent electrode and the second transparent electrode and which comprises nano-sized material configured to convert electromagnetic energy into heat energy and liquid crystalline elastomers; where a voltage is applied cross the first transparent electrode and the second transparent electrode, the nano-sized material converts electromagnetic energy into heat energy, so that the liquid crystalline elastomers are in cholesterol phase and reflect light of all wavelengths, and where no voltage is applied between the first transparent electrode and the second transparent electrode, the polymer layer is in transparent state.

In the grating according to the embodiments of the present disclosure, since the polymer layer comprises nano-sized material and liquid crystalline elastomers, the polymer layer is in glass state which is a transparent state when no voltage is applied, thereby achieving 2D display. And, since the polymer layer in the present disclosure can have a thickness in a magnitude of microns, the light transmittance loss can be reduced during 2D display as compared with conventional liquid crystal gratings having a thickness of dozens of millimeters. Further, since the polymer layer is only disposed on the first transparent electrode, as compared with the conventional liquid crystal gratings using an entire liquid crystal layer, the light transmittance loss can be reduced during 2D display. Since the nano-sized material, such as ferroferric oxide nano material, has a property of converting electromagnetic energy into heat energy after being applied with a voltage, has an electromagnetic property itself, and has a size in nano order and a nano effect of a relatively high specific surface area, it can convert electromagnetic energy into heat energy, and thus the polymer layer is heated so that the liquid crystalline elastomers are in cholesterol phase. The polymer layer can reflect light of all wavelengths, thus achieving the function of barrier fence type gratings and thus 3D display. Further, the polymer layer can be manufactured to have a thickness of several microns. Therefore, the thickness of the grating can be significantly decreased. When the grating and the display panel are assembled into a display device, the thickness of the naked-eye 3D display device can be decreased.

Any nano-sized material capable of converting electromagnetic energy into heat energy can be applied in the embodiments of the present disclosure. In one embodiment of the present disclosure, the nano-sized material is nano particles of ferroferric oxide or nano rods of ferroferric oxide. In another embodiment of the present disclosure, the nano-sized material is nano particles of ferroferric oxide. The electromagnetic property is an inherent characteristic of the nano particles of ferroferric oxide. Since the nano particles themselves have sizes in an order of nanometer and a nano effect of relatively high specific surface area, they can convert electromagnetic energy into heat energy.

In one embodiment of the present disclosure, the nano-sized material has a weight percentage of 1%-10% in the polymer layer.

The number of layers of the polymer layer enabling light of all wavelengths to be reflected is not restricted. In one embodiment of the present disclosure, the polymer layer is of at least two layers, the liquid crystalline elastomers are side-chain siloxane liquid crystalline elastomers, the cholesterol phases of the at least two polymer layers reflect light of all wavelengths.

In one embodiment of the present disclosure, each polymer layer has a thickness no more than 1.0 micron. In another embodiment of the present disclosure, each polymer layer has a thickness of 0.2-1.0 micron. Therefore, the grating has a very small thickness, which significantly reduces a thickness of a display device formed by assembling the grating and a display panel.

In one embodiment of the present disclosure, each polymer layer further comprises a polymer network formed by polymerizing the UV-polymerizable liquid crystalline monomer by the photo-initiating action of the photo-initiator.

In one embodiment of the present disclosure, in each polymer layer, the side-chain polysiloxane liquid crystalline elastomers have a weight percentage of 69%-96.9%, the UV-polymerizable liquid crystalline monomer has a weight percentage of 2%-20%, and the photo-initiator has a weight percentage of 0.1%-1%.

In one embodiment of the present disclosure, the UV-polymerizable liquid crystalline monomer is 1,4-bis (4-(6'-propenyloxy hexyloxy)benzoyloxy)-2-toluene, and the photo-initiator is benzoin dimethyl ether.

In one embodiment of the present disclosure, the side-chain polysiloxane liquid crystalline elastomers are obtained by grafting the liquid crystalline monomer as illustrated in Formula I and the cross-linking agent as illustrated in Formula II onto poly methyl hydrosiloxane as illustrated in Formula III:

light and purple light respectively, or otherwise the two polymer layers reflect yellow light and blue light respectively.

At least one embodiment of the present disclosure provides a display device, comprising a display panel and any one of the above-described gratings positioned at a light emitting side of the display panel.

In the display device according to the embodiments of the present disclosure, since the display device adopts the above-described grating, the display device can have a relatively small thickness and can reduce light transmission loss during 2D display.

In one embodiment of the present disclosure, the first substrate of the grating is a base substrate on the light emitting side of the display panel.

By using the base substrate on the light emitting side of the display panel as the first substrate of the grating, the thickness of the display device can be further reduced.

In one embodiment of the present disclosure, the display device further comprises a driving circuit configured to apply a voltage between the first transparent electrode and the second transparent electrode in the grating.

At least one embodiment of the present disclosure provides a manufacturing method of a grating, comprising:

forming a first transparent electrode and a second transparent electrode having grating structures respectively on a first substrate and a second substrate, the first transparent electrode and the second transparent electrode being correspondingly disposed;

forming a polymer layer on the first transparent electrode, the polymer layer containing nano-sized material for converting electromagnetic energy into heat energy and liquid crystalline elastomers; where a voltage is applied between the first transparent electrode and the second transparent electrode, the nano-sized material converts electromagnetic

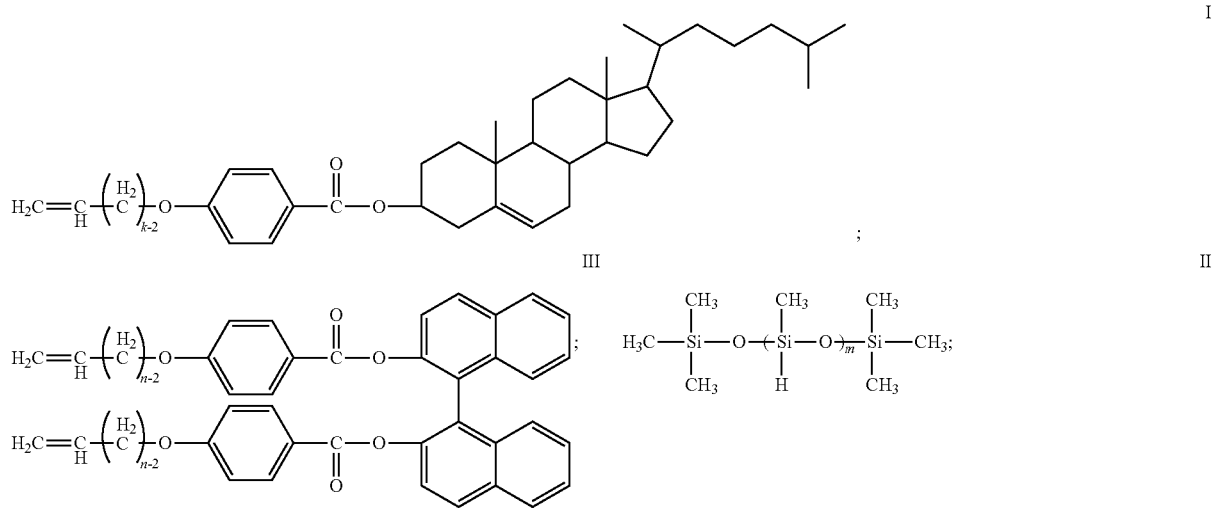

wherein k in Formula I is an integer selected from 3 to 10, n in Formula II is an integer selected from 3 to 10, and m in Formula III is an integer selected from 4 to 30.

In one embodiment of the present disclosure, the liquid crystalline monomer as illustrated in Formula I and the cross-linking agent as illustrated in Formula II have a mol ratio of 1:9~9:1.

In one embodiment of the present disclosure, the polymer layer is of two layers, the two polymer layers reflect green energy into heat energy so that the polymer layer is in cholesterol phase and reflects light of all wavelengths; where no voltage is applied between the first transparent electrode and the second transparent electrode, the polymer layer is in transparent state; and cell-assembling the first substrate and the second substrate.

In one embodiment of the present disclosure, the polymer layer is of at least two layers, the liquid crystalline elastomers are side-chain polysiloxane liquid crystalline elastomers, and the cholesterol phases of the at least two polymer layers reflect light of all wavelengths.

In one embodiment of the present disclosure, forming two polymer layers on the first transparent electrode comprises:

Step a. applying a first mixture layer onto a first transparent electrode, the first mixture layer comprising side-chain polysiloxane liquid crystalline elastomers, nano-sized material, UV-polymerizable liquid crystalline monomer and photo-initiator;

Step b. heating the first mixture layer to a first temperature so that the side-chain polysiloxane liquid crystalline elastomers form a first pitch;

Step c. irradiating the first mixture layer having the set pitch by UV light through a mask plate having apertures corresponding to the first transparent electrode, so that the UV-polymerizable liquid crystalline monomer forms a polymer network to stabilize the first pitch and the mixture layer can reflect light of the first wavelength, and cooling the first mixture layer to room temperature and forming a first polymer layer pattern by etching;

Step d. applying a second mixture layer on the first transparent substrate formed with the first polymer layer pattern having the first pitch;

Step e. heating the second mixture layer to a second temperature and repeating the Step c to form a second polymer layer having a second pitch and reflecting light of a second wavelength.

In one embodiment of the present disclosure, at least three polymer layers having different pitches are obtained by adjusting the temperature in the Step b and repeating the Step a to the Step c at least once.

In the mixture layer, the side-chain polysiloxane liquid crystalline elastomers has a weight percentage of 69%-96.9%, the nano-sized material has a weight percentage of 1%-10%, the UV-polymerizable liquid crystalline monomer has a weight percentage of 2%-20%, and the photo-initiator has a weight percentage of 0.1%-1%.

In one embodiment of the present disclosure, when there are two polymer layers, a threshold of the first pitch is 150-5000 nm, and a threshold of the second pitch is 150-5000 nm In one embodiment of the present disclosure, when there are two polymer layers, a threshold of the first temperature is 30-120° C., and a threshold of the second temperature is 30-120° C.

BRIEF DESCRIPTION OF THE DRAWINGS

In order to make objects, technical details and advantages of the embodiments of the disclosure apparent, the technical solutions of the embodiment will be described in a clearly and fully understandable way in connection with the drawings related to the embodiments of the disclosure. It is obvious that the described embodiments are just a part but not all of the embodiments of the disclosure. Based on the described embodiments herein, those skilled in the art can obtain other embodiment(s), without any inventive work, which should be within the scope of the disclosure.

DETAILED DESCRIPTION

In order to make objects, technical details and advantages of the embodiments of the disclosure apparent, the technical solutions of the embodiment will be described in a clearly and fully understandable way in connection with the drawings related to the embodiments of the disclosure. It is obvious that the described embodiments are just a part but not all of the embodiments of the disclosure. Based on the described embodiments herein, those skilled in the art can obtain other embodiment(s), without any inventive work, which should be within the scope of the disclosure.

Embodiments of the present disclosure provide a grating, a display device having the grating, and a manufacturing method of the grating. The grating is used together with a display panel to achieve the naked-eye 3D display and reduce loss in light transmission at the time of 2D display. The grating contains a polymer layer. When no voltage is applied, the polymer layer is in glass state and is transparent and can achieve 2D display. After a voltage is applied, since nano-sized material can convert electromagnetic energy into heat energy and the polymer layer is heated so that the liquid crystalline elastomers are in cholesterol phase and can reflect the light of a certain wavelength, the polymer layer can reflect all the light within the range of visible light and thus achieve the function of the barrier fence type grating and achieve 3D display.

In view that the display function is achieved in the display device by synthesizing white light by means of light of RGB or other base colors, as long as the polymer layer in the grating can reflect all the base color light used in the display device, i.e., reflect all the light within the range of visible light, the function of the barrier fence type grating can be achieved.

Hereinafter, technical solutions according to the embodiments of the present disclosure will be described with reference to the drawings.

Figure 1:
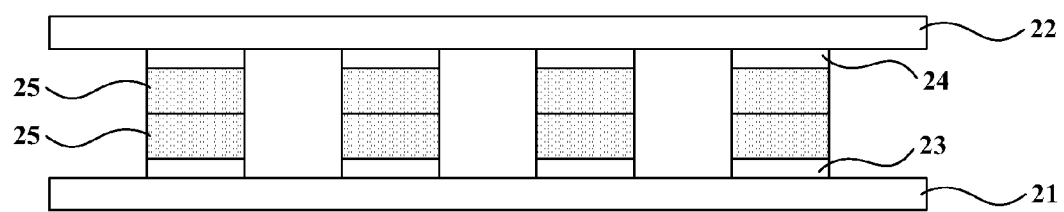
FIG. 1 is a structural illustrative view of a grating according to one embodiment of the present disclosure.

At least one embodiment of the present disclosure provides a grating. As illustrated in FIG. 1 which is a structural illustrative view of the grating according to one embodiment of the present disclosure, the grating comprises:

a first substrate 21 and a second substrate 22 which are oppositely disposed, wherein a first transparent electrode 23 having a grating structure is disposed on a side of the first substrate 21 facing towards the second substrate 22, and a second transparent electrode 24 disposed to be opposite to the first transparent electrode 23 is disposed on a side of the second substrate 22 facing towards the first substrate 21, and a polymer layer 25 disposed between the first transparent electrode 23 and the second transparent electrode 24, wherein the polymer layer 25 contains therein nano-sized material converting electromagnetic energy into heat energy and liquid crystalline elastomers, wherein when a voltage is applied between the first transparent electrode 23 and the second transparent electrode 24, the nano-sized material converts electromagnetic energy into heat energy, so that the liquid crystalline elastomers are in cholesterol phase and reflect light of all wavelengths, and wherein when no voltage is applied between the first transparent electrode 23 and the second transparent electrode 24, the polymer layer 25 is in transparent state.

In the grating according to the embodiments of the present disclosure, since the polymer layer 25 contains nano-sized material and liquid crystalline elastomers, the polymer layer 25 is in glass state and is transparent when no voltage is applied, thereby achieving 2D display. And moreover, since the polymer layer 25 in the embodiments of the present disclosure can have a thickness in a magnitude of micron, the light transmittance loss can be reduced at the time of 2D display as compared with conventional liquid crystal gratings having a thickness of dozens of millimeters. Further, since the polymer layer 25 is only positioned above the first transparent electrode 23, as compared with the conventional liquid crystal gratings using an entire liquid crystal layer, the light transmittance loss can be reduced at the time of 2D display. After a voltage is applied, since the nano-sized material has a property of converting electromagnetic energy into heat energy, heating of polymer layer can be achieved so that the liquid crystalline elastomers are in cholesterol phase and can reflect the light having a certain wavelength. For example, when the nano-sized material is ferroferric oxide nano-sized material, since it has electromagnetic property itself and it has a size in nanometer order and a nano effect of a relatively high specific surface area, it can convert electromagnetic energy into heat energy. The polymer layer can reflect light of all wavelengths, and thus achieving the function of barrier fence type gratings and thus 3D display. Further, the polymer layer 25 can be manufactured to have a thickness of several microns. Therefore, the thickness of the grating can be significantly decreased. When the grating and the display panel are assembled into a display device, the thickness of the naked-eye 3D display device can be decreased. The polymer layer 25 has a structure as illustrated in FIG. 1, i.e., the polymer layer is positioned above the first transparent electrode 23 and corresponds to each electrode unit of the first transparent electrode 23.

In such a technical solution, when the content of the nano-sized material converting electromagnetic energy into heat energy is lower than 1%, a problem in which heating is not uniform and is slow will occur, while when the content of the nano-sized material is higher than 10%, there will be a waste of nano-sized material. Therefore, in the technical solution of the present invention, the weight percentage of the nano-sized material converting electromagnetic energy into heat energy is 1%-10%.

Any nano-sized material capable of converting electromagnetic energy into heat energy can be applied in the embodiments of the present disclosure. For example, the nano-sized material can be nano particles of ferroferric oxide or nanorods of ferroferric oxide. The nanorods of ferroferric oxide may have a problem in that mixing is not uniform, and the nano-sized material is nano particles of ferroferric oxide. The electromagnetic property is an inherent characteristic of the nano particles of ferroferric oxide. Since the nano particles themselves have sizes in nanometer order and a nano effect of relatively high specific surface area, they can convert electromagnetic energy into heat energy.

Still referring to FIG. 1, the polymer layer 25 is of at least two layers, and the liquid crystalline elastomers are side-chain polysiloxane liquid crystalline elastomers. The cholesterol phases of the at least two polymer layers reflect light of all wavelengths. It would be appreciated that the number of layers of the polymer layer 25 is not limited, as long as the cholesterol phases of the polymer layers 25 can reflect light of all wavelengths.

Still referring to FIG. 1, for example, each of the polymer layers 25 has a thickness of 0.2-1.0 micron (μm). The thickness of each polymer layer 25 is no more than 1.0 micron. Therefore, the thickness of the grating is pretty small, which significantly reduces the thickness of the display device formed by assembling the grating and the display panel together. For example, the thickness of the polymer layer is 0.2 μm, 0.3 μm, 0.5 μm, 0.7 μm, 0.8 μm, 0.9 μm or 1.0 μm, wherein the thickness of the respective polymer layer can be identical or different.

Still referring to FIG. 1, for example, each polymer layer 25 further comprises a polymer network formed by UV-polymerizable liquid crystalline monomer by the photo-initiating action of the photo-initiator.

In each polymer layer 25, the weight percentage of the side-chain polysiloxane liquid crystalline elastomers is 69%-96.9%, the weight percentage of the UV-polymerizable liquid crystalline monomer is 2%-20%, and the weight percentage of the photo-initiator is 0.1%-1%.

In one embodiment of the present disclosure, the UV-polymerizable liquid crystalline monomer is 1,4-bis(4-(6'-propenyloxy hexyloxy)benzoyloxy)-2-toluene, having the following chemical structure:

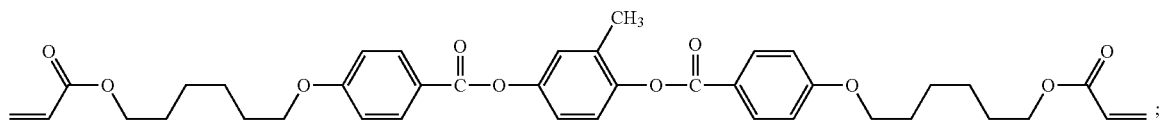 [SMILES: C=CC(=O)OCCCCCCOc1ccc(C(=O)Oc2ccc(OC(=O)c3ccc(OCCCCCCOC(=O)C=C)cc3)c(C)c2)cc1]

The photo-initiator is benzoin dimethyl ether with the following chemical structure:

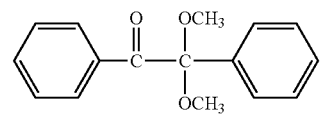

In one embodiment of the present disclosure, the side-chain polysiloxane liquid crystalline elastomers are obtained by grafting the liquid crystalline monomer as illustrated in Formula I and the cross-linking agent as illustrated in Formula II onto poly methyl hydrosiloxane as illustrated in Formula III:

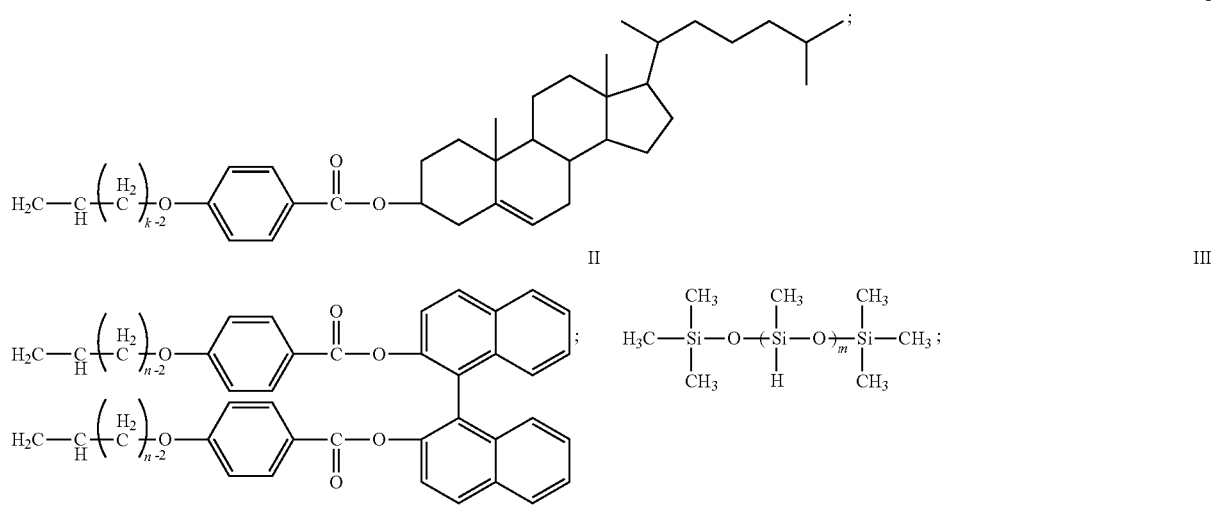

wherein, k in Formula I is an integer selected from 3 to 10, n in Formula II is an integer selected from 3 to 10, and m in Formula III is an integer selected from 4 to 30.

Figure 2:
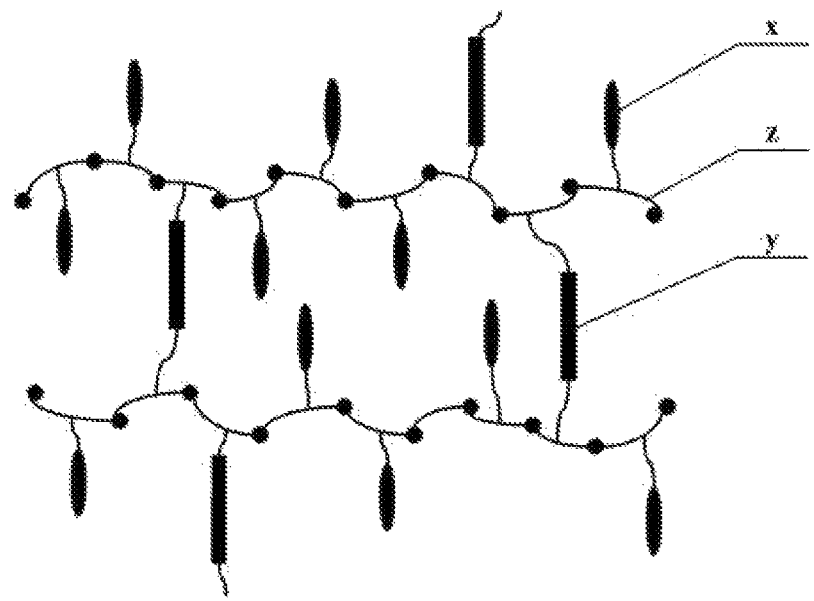
FIG. 2 is an illustrative view of the chemical structure of side-chain polysiloxane liquid crystalline elastomers used in the grating according to one embodiment of the present disclosure.
Figure 2:
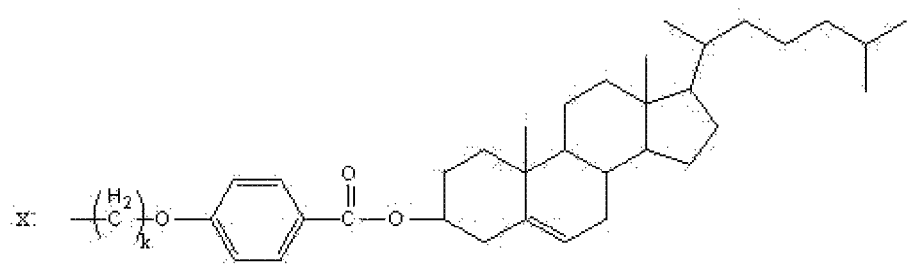
Figure 2:
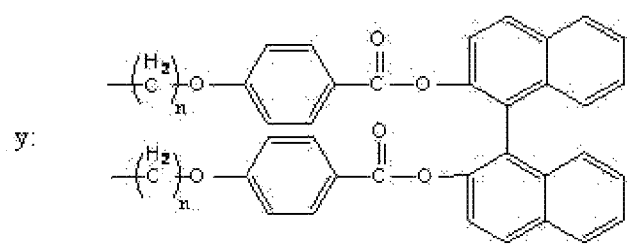
Figure 2:
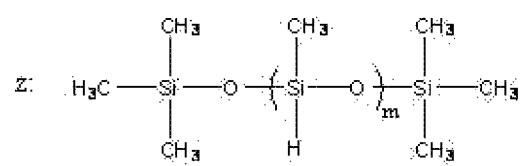

In one embodiment of the present disclosure, the mol ratio of the liquid crystalline monomer in Formula I to the cross-linking agent in Formula II is 1:9 to 9:1. As illustrated in FIG. 2, which is an illustrative view of the chemical structure of side-chain polysiloxane liquid crystalline elastomers used in the grating of the present disclosure, x (elliptic side chain) represents liquid crystalline monomer group, y (rectangular side chain) represents cross-linking agent group, z (main chain) represents polymethyl hydrosilicone.

Figure 3:
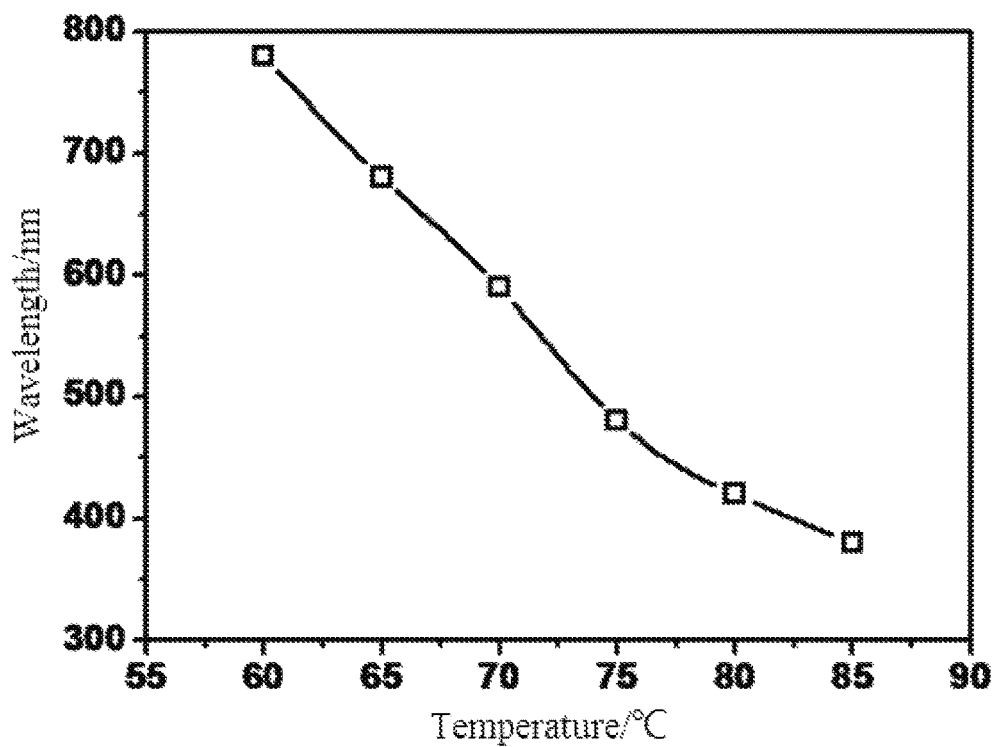
FIG. 3 is a plot of wavelength of the reflected wave of side-chain polysiloxane liquid crystalline elastomers as illustrated in FIG. 2 in which m=6, n=4 and k=4, which is varied as temperature is changed.

The side-chain polysiloxane liquid crystalline elastomers used in the embodiments of the present disclosure can be in cholesterol phase above the glass transition temperature and can reflect visible light of a certain wavelength. As illustrated in FIG. 3 which is a plot of the wavelength of reflected wave of side-chain polysiloxane liquid crystalline elastomers as illustrated in FIG. 2 in which m=6, n=4 and k=4, which is varied as temperature is changed. It can be seen from FIG. 3 that when the temperature rises to 85° C. from 60° C., the wavelength of reflected wave is reduced to 380 nm from 780 nm so as to cover the entire range of wavelength of visible light. Therefore, the side-chain polysiloxane liquid crystalline elastomers can be made to reflect light of any wavelength within the visible light range by adjusting the temperature.

Figure 4:
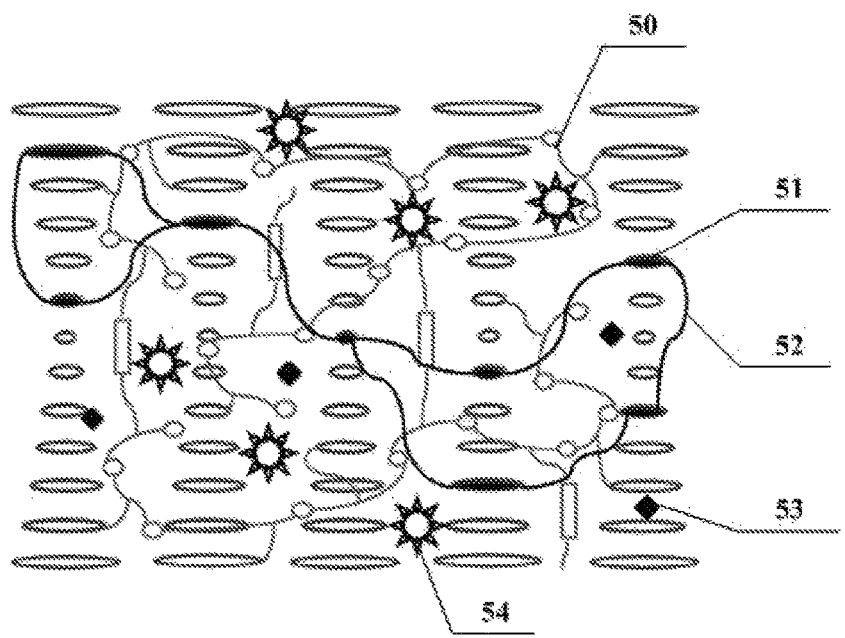
FIG. 4 is a structural illustrative view of a polymer layer containing side-chain polysiloxane liquid crystalline elastomers in the grating according to one embodiment of the present disclosure.

As illustrated in FIG. 4 which is structural illustrative view of the polymer layer containing side-chain polysiloxane liquid crystalline elastomers in the grating according to one embodiment of the present disclosure, the polymer layer comprises side-chain polysiloxane liquid crystalline elastomers 50, repetitive units 51 of polymer networks (equivalent to a structure formed by opening the terminal double bonds of the UV-polymerizable liquid crystalline monomer), polymer networks 52, a photo-initiator 53 and nano-sized material 54 capable of converting optical energy into heat energy (such as ferroferric oxide nano particle).

When the polymer layers are of two layers, the two polymer layers reflect green light and purple light respectively or the two polymer layers reflect yellow light and blue light respectively.

Figure 5:
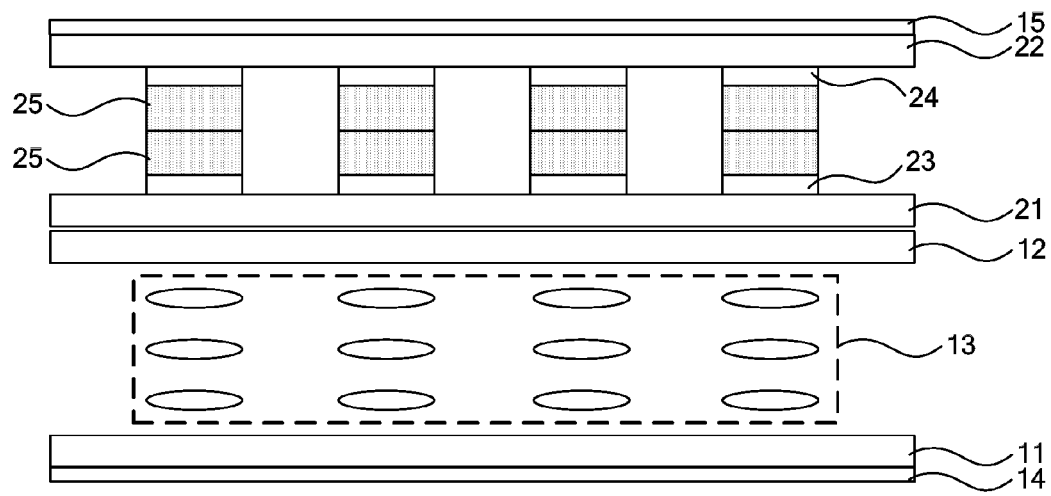
FIG. 5 is a structural illustrative view of a display device according to one embodiment of the present disclosure.

At least one embodiments of the present disclosure further provides a display device as illustrated in FIG. 5 which an illustrative structural view of the display device according to one embodiment of the present disclosure. The display device comprises a display panel and any one of the gratings as described above and disposed on the light emitting side of the display panel. Taking a liquid crystal display panel as an example, the display panel comprises a third substrate 11 and a fourth substrate 12, and a liquid crystal layer 13 positioned between the third substrate 11 and the fourth substrate 12. For example, the third substrate 11 is an array substrate, and the fourth substrate 12 is a color filter substrate. The grating is disposed at the light emitting side of the display panel and the first substrate 21 of the grating can be bonded with the display panel by adhering. The display device as illustrated in FIG. 5 can further comprise an upper polarizer 15 disposed above the second substrate 22 of the grating and a lower polarizer 14 disposed beneath the third substrate 11 of the display panel. Furthermore, the upper polarizer 15 is not limited to the position as illustrated in FIG. 5, and can be disposed between the first substrate 21 of the grating and the fourth substrate 12 of the display panel.

In the display device according to the embodiments of the present disclosure, since the display device utilizes the above-described grating, the display device can have a relatively small thickness and the light transmission loss of 2D display can be reduced.

In one embodiment of the present disclosure, the display device further comprises a driving circuit configured to apply voltage between the first transparent electrode and the second transparent electrode in the grating. When the driving circuit of the display device applies voltage between the first transparent electrode and the second transparent electrode, the ferroferric oxide nano particle having an electromagnetic property can convert electromagnetic energy into heat energy by virtue of its nano effect, so that the polymer layer where it is located is heated and becomes to be in cholesterol phase, and thus 3D display can be achieved.

The display device is not limited in terms of its form, but can be any product or component having any display function, such as electronic paper, liquid crystal television, liquid crystal display, digital photo frame, cell phone, tablet, and etc.

Figure 6:
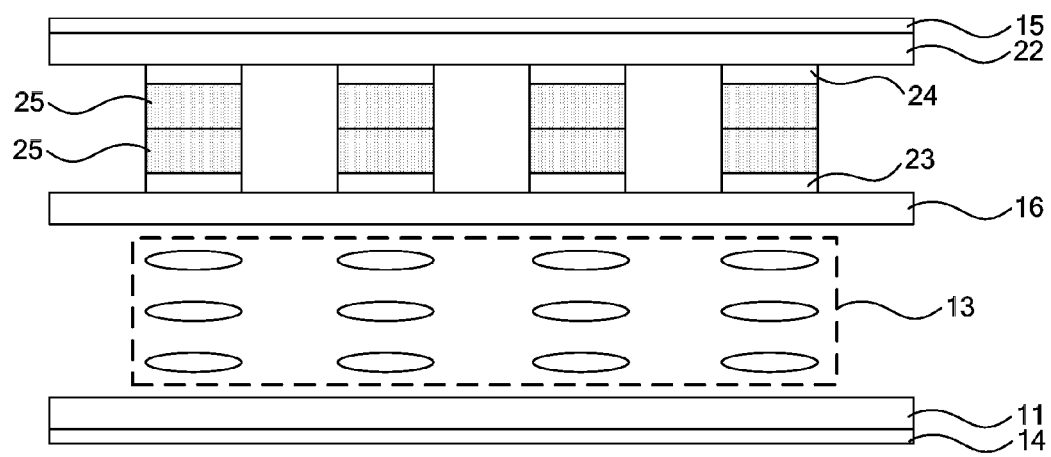
FIG. 6 is a structural illustrative view of a display device according to one embodiment of the present disclosure.

FIG. 6 is an illustrative structural view of the display device according to one embodiment of the present disclosure, wherein the first substrate of the grating is a base substrate 16 on the light emitting side of the display panel.

To further reduce the thickness of the display device, the substrate plate 16 on the light emitting side of the display panel is directly served as the first substrate of the grating. That is to say, in the structure of the display device as illustrated in FIG. 6, in case that a liquid crystal panel is exemplified, the display device comprises subsequently, from top to bottom, an upper polarizer 15, a second substrate 22, a second transparent electrode 24, polymer layers 25, a first transparent electrode 23, a base substrate 16, a liquid crystal layer 13, a third substrate 11 and a lower polarizer 14. The base substrate 16 usually refers to a base substrate in the color filter substrate and the third substrate 11 is usually an array substrate.

When the substrate plate 16 on the light emitting side of the display panel is directly used as the first substrate of the grating, i.e., when the mixture layers containing side-chain polysiloxane liquid crystalline elastomers is directly applied onto the substrate plate 16 on the light emitting side of the liquid crystal display panel, each mixture layer can only have a thickness of 0.2-1.0 µm, thereby further reducing the thickness of the display device. Since the thickness of the grating is greatly decreased, an influence on the transmittance of 3D display panel is reduced and the display effect is improved.

Figure 7:
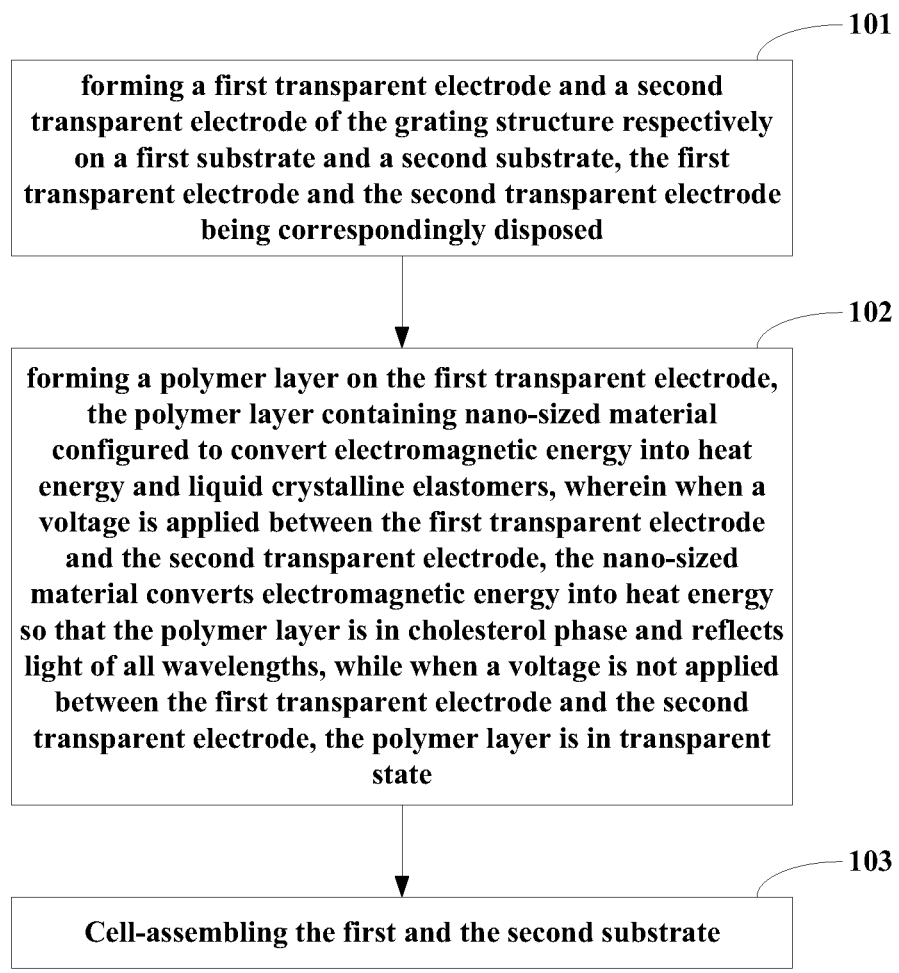
FIG. 7 is an illustrative flow chart of a manufacturing method of the grating according to one embodiment of the present disclosure.

At least one embodiment of the present disclosure further provides a manufacturing method of grating, as illustrated in FIG. 7 which is an illustrative flow chart of the manufacturing method of the grating according to the embodiments of the present disclosure, comprising:

a step 101 of forming a first transparent electrode and a second transparent electrode of the grating structure respectively on a first substrate and a second substrate, the first transparent electrode and the second transparent electrode being correspondingly disposed;

a step 102 of forming a polymer layer on the first transparent electrode, the polymer layer containing nano-sized material configured to convert electromagnetic energy into heat energy and liquid crystalline elastomers, wherein when a voltage is applied between the first transparent electrode and the second transparent electrode, the nano-sized material converts electromagnetic energy into heat energy so that the polymer layer is in cholesterol phase and reflects light of all wavelengths, while when a voltage is not applied between the first transparent electrode and the second transparent electrode, the polymer layer is in transparent state;

a step 103 of cell-assembling the first substrate and the second substrate.

In this technical solution, the manufactured grating has a structure as illustrated in FIG. 1, comprising subsequently, from top to bottom, a second substrate 22, a second transparent electrode 24, polymer layers 25, a first transparent electrode 23 and a first substrate 21. During manufacturing of the transparent electrode 24, polymer layers 25 and the first transparent electrode 23, a same mask plate is used so that the retained portions of these three layers are corresponding to each other. That is to say, a laminated structure as illustrated in FIG. 1 is formed.

Of course, to further reduce the thickness, a first transparent electrode having the grating structure can be directly formed on the base substrate on the light emitting side of the display panel, and then at least two polymer layers, each of which contains side-chain polysiloxane liquid crystalline elastomers, are formed, and then a second substrate having the second transparent electrode is covered on the polymer layers.

In one embodiment of the present disclosure, in the step 102 of forming a polymer layer on the first transparent electrode, when there are two polymer layers, the process of the step comprises:

a step a of applying a mixture layer comprising side-chain polysiloxane liquid crystalline elastomers, nano-sized material, UV-polymerizable liquid crystalline monomer and photo-initiator onto the first transparent electrode;

a step b of heating the mixture layer to a first set temperature so that the side-chain polysiloxane liquid crystalline elastomers form a first set pitch;

a step c of forming a first polymer layer by irradiating by UV light the mixture layer formed with a set pitch through a mask plate having apertures corresponding to the first transparent electrodes, forming a polymer network by the UV-polymerizable liquid crystalline monomer so as to stabilize the first pitch and to enable reflection of light having a first wavelength, and cooling the mixture layer to the room temperature and then etching;

a step d of applying a second mixture layer onto the first transparent substrate formed with a first polymer layer having a first pitch;

a step e of forming a second polymer layer having a second pitch and reflecting light of a second wavelength by adjusting the first temperature in step b to a second temperature and repeating the step c, wherein the second mixture layer is heated to a second set temperature, so that the side-chain polysiloxane liquid crystalline elastomers form a second set pitch; the second mixture layer formed with the set pitch is irradiated by UV light through the mask plate, so that the UV-polymerizable liquid crystalline monomer forms a polymer network to stabilize the second pitch and to enable reflection of light having a second wavelength, the second polymer layer is cooled to the room temperature and then is etched so as to form the second polymer layer, wherein the mask plate has apertures corresponding to the first transparent electrodes.

In one embodiment of the present disclosure, the first temperature in the step b is adjusted, the step a to the step c are repeated at least once, and thus at least three polymer layers having different pitches are obtained.

In such a technical solution, it is to be noted that if three or more polymer layers are to be formed, the first temperature in the step b is adjusted and the cycle from the step a to the step c is performed at least once. Assuming a case of three polymer layers, the cycle is performed once and a third polymer layer on the second polymer layer is obtained. That is to say, the heating temperature is adjusted to be a third temperature and thus a third pitch is obtained and a third reflection wavelength is correspondingly obtained. Assuming a case of four polymer layers, the cycle is performed twice and a third polymer layer on the second polymer layer and a fourth polymer layer on the third polymer layer are obtained. That is to say, the heating temperature is adjusted to be a third temperature threshold and thus a third pitch is obtained and a third reflection wavelength is correspondingly obtained, thereby obtaining a third polymer layer. And then, the heating temperature is adjusted to be a fourth temperature and thus a fourth pitch is obtained and thus a fourth reflection wavelength is obtained, thereby obtaining a fourth polymer layer.

In such a technical solution, forming two polymer layers is exemplified. Firstly, a mixture layer containing the above components is applied onto a first transparent electrode and then is heated to a temperature $T_1$ so that the mixture layer forms a set pitch $P_1$. And then, the mixture layer is irradiated by UV light through a mask plate so that the UV-polymerizable liquid crystalline monomer subjected to irradiation has a polymerization action so as to form a polymer network to stabilize the pitch $P_1$ and then the mixture layer is cooled to the room temperature. And then a first polymer layer on the first transparent electrode is formed by etching. A mixture layer containing the above components is further applied onto a first polymer layer and then is heated to a temperature $T_2$ so that the mixture layer forms a set pitch $P_2$. And then, the mixture layer is irradiated by UV light through the same mask plate so that the UV-polymerizable liquid crystalline monomer subjected to irradiation has a polymerization action so as to form a polymer network to stabilize the pitch $P_2$ and then the mixture layer is cooled to the room temperature. And then a second polymer layer on the first polymer layer is formed by etching.

The temperature $T_1$ and the temperature $T_2$ are temperatures under which the mixture layer is in cholesterol phase and can be 30-120° C. The specific values of the temperature $T_1$ and the temperature $T_2$ are not limited, as long as the resultant two polymer layers can reflect light of all wavelengths. The specific values of the pitch $P_1$ and the pitch $P_2$ are not limited. The pitch $P_1$ can be in a range of 150-5000 nm, and the pitch $P_2$ can be in a range of 150-5000 nm The pitch of the polymer layer determines the reflection wavelength of the polymer layer. Therefore, when the components in the mixture layers have certain contents, the pitch can be adjusted by adjusting the heating temperature. Moreover, when the heating temperature is determined, the pitch can be adjusted by adjusting the content of the side-chain polysiloxane liquid crystalline elastomers in the mixture layer. The reflection wavelength of the polymer layer can be made different by the above adjusting methods.

The preparing step of each polymer layer can be as follows. Firstly, a mixture is applied onto a first transparent electrode and then is irradiated by UV light through a mask plate having a pattern which is identical with the first transparent electrode. That is to say, the portions corresponding to the first transparent electrode can be irradiated by UV light, while the interval portions between the first transparent electrodes are covered by the mask plate so that the interval portions are not irradiated by UV light. Therefore, the UV-polymerizable liquid crystalline monomer in the interval portions will not be subject to cross-linking reaction, while only the UV-polymerizable liquid crystalline monomer in the positions corresponding to the first transparent electrode is subject to cross-linking reaction and forms a polymer network. Then, etching is performed through solvent. That is to say, mixture which has not been irradiated by UV light is removed through solvent. The solvent is organic solvent, such as dichloromethane, trichloromethane and etc.

Each mixture layer can comprise side-chain polysiloxane liquid crystalline elastomers having a weight percentage of 69%-96.9%, nano-sized material having a weight percentage of 1%10%, UV-polymerizable liquid crystalline monomer having a weight percentage of 2%-20%, and photo-initiator having a weight percentage of 0.1%-1%.

Figure 8A:
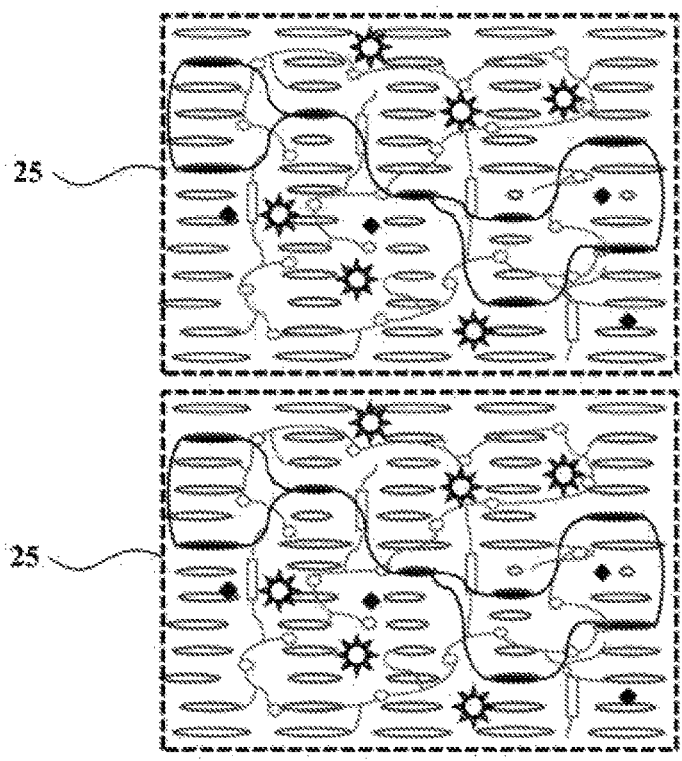
FIG. 8a is a structural illustrative view of the polymer layer in the grating when no voltage is applied.
Figure 8B:
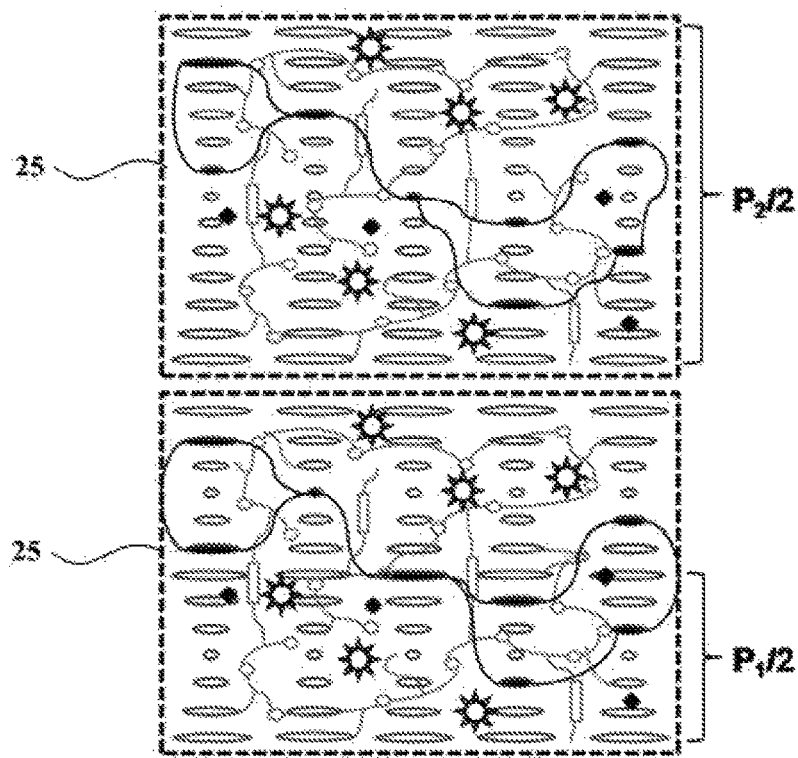
FIG. 8b is a structural illustrative view of the polymer layer in the grating when a voltage is applied.

The operating principle of the grating is described by exemplifying that there are two polymer layers in the grating. As illustrated in FIG. 8a which is an illustrative structural view of the polymer layers in the grating when a voltage is not applied, in the room temperature, when no voltage is applied, the polymer layers 25 are in glass state and at this time the grating is in transparent state and 2D display is performed. When a voltage is applied, nano particles of ferroferric oxide in the polymer layers 25 convert electromagnetic energy into heat energy and thus the polymer layers 25 is heated and the side-chain polysiloxane liquid crystalline elastomers are transferred into cholesterol phase and have a fixed pitch after UV-polymerization and reflect visible light having a certain wavelength. That is to say, as illustrated in FIG. 8b which is an illustrative structural view of the polymer layer in the grating when a voltage is applied, the pitch of the first polymer layer is $P_1$ and can reflect the visible light $\lambda$, while the pitch of the second polymer layer is $P_2$ and can reflect the visible light $\lambda_2$. The two polymer layers can reflect all the light within the range of visible light through adjusting the temperature or the ratio of the components in respective mixture layers and serve as a grating and thus 3D display is achieved.

Polymer layers can be of three, four, five or more layers, as long as the cholesterol phases of these polymer layers can reflect all the light within the range of visible light. For example, the polymer layers are of three layers and the three polymer layers reflect red light, green light and blue light respectively. For example, in a display device, RGB base color lights are usually used to synthesize white light so as to achieve display. If the polymer layers can reflect red light, green light and blue light, the polymer layers can reflect all the light within the range of visible light and serve as a grating and thus 3D display is achieved. Of course, other base color lights can be used in a display device to synthesize white light, as long as the polymer layers can reflect all of these base color lights and serve as a grating and thus 3D display is achieved.

Several embodiments are exemplified hereinafter to describe the technical solutions of the present disclosure. However, the embodiments of the present disclosure are not limited thereto. In the following embodiments, the display device according to the embodiments of the present disclosure is manufactured by using ferroferric oxide particles as nano-sized material.

Embodiment 1

A manufacturing processes of a 3D liquid crystal display device is as follows:

a first step of manufacturing a liquid crystal display panel through a conventional method;

a second step of forming a first transparent electrode having a grating structure on a base substrate on the light emitting side of the liquid crystal display panel by etching process; for example, a transparent electrode layer covering a surface of the base substrate is firstly formed and then a part of the transparent electrode layer is removed by etching, so that the first transparent electrode having a grating structure is formed;

a third step of grafting the cross-linking agent of binaphthol b and a liquid crystalline monomer a in a weight ratio of 5:4 as illustrated in FIG. 2 wherein n=4 and k=4 onto poly methyl hydrosiloxane c of m=6 so as to form side-chain polysiloxane liquid crystalline elastomers, uniformly mixing the resultant side-chain polysiloxane liquid crystalline elastomers, nano particles of ferroferric oxide, UV-polymerizable liquid crystalline monomer and photo-initiator in a weight percentage of 89.75%/5%/5%/0.25% and thus obtaining a mixture;

a fourth step of obtaining a mixture layer by applying a layer of the mixture obtained in the third step with a thickness of 0.5 μm on the first transparent electrode and then heating the mixture layer to a temperature of 65° C. so that the mixture layer forms a pitch of 490 nm and can reflect visible light having a wavelength of 680 nm, i.e., yellow light; and irradiating the mixture layer through a mask plate (apertures of the mask plate corresponding to the first transparent electrodes) by UV light having an intensity of 5 mw/cm$^2$ so that the UV-polymerizable liquid crystalline monomer in the mixture layer is subject to cross-linking reaction to form a polymer network so as to stabilize the current pitch and then the mixture layer is cooled to room temperature and a first polymer layer on the first transparent electrode is obtained by etching;

a fifth step of obtaining a mixture layer by further applying a layer of the mixture obtained in the third step with a thickness of 0.3 μm on the first polymer layer and then heating the mixture layer to a temperature of 80° C. so that the mixture layer forms a pitch of 290 nm and can reflect visible light having a wavelength of 460 nm, i.e., blue light; and irradiating the mixture layer through a mask plate (apertures of the mask plate corresponding to the first transparent electrodes) by UV light having an intensity of 5 mw/cm$^2$ so that the UV-polymerizable liquid crystalline monomer in the mixture layer is subject to cross-linking reaction to form a polymer network so as to stabilize the current pitch and then the mixture layer is cooled to room temperature and a second polymer layer on the first polymer layer is obtained by etching;

a sixth step of covering a second substrate with second transparent electrodes on the second polymer layer, wherein the second transparent electrodes face towards the second polymer layer and correspond to the second polymer layer, that is to say, the second transparent electrodes, the two polymer layers and the first transparent electrodes are laminated and thus a display panel having a grating is manufactured and then the display panel is assembled with a backlight module to form a 3D display device.

Under the room temperature, when no voltage is applied between the first transparent electrode and the second transparent electrode, the two polymer layers containing side-chain polysiloxane liquid crystalline elastomers are in glass state and the three-dimensional grating is in transparent state, at this time 2D display is performed. When a voltage is applied between the first transparent electrode and the second transparent electrode, the nano particles of ferroferric oxide in the polymer layers having electromagnetic property convert electromagnetic energy into heat energy so that the polymer layers is heated and the side-chain polysiloxane liquid crystalline elastomers are transformed into cholesterol phase and have a fixed pitch after UV-polymerization. That is to say, the first polymer layer reflects yellow light, the second polymer layer reflects blue light, and both of the two reflect all the light within the range of visible light and the effect of a grating is achieved, thereby achieving 3D display. The first polymer layer has a thickness of 0.5 μm, and the second polymer layer has a thickness of 0.3 μm. Contrary to a liquid crystal grating having a thickness of dozens of millimeters in conventional art, the thickness of the grating is significantly reduced.

Embodiment Two

A manufacturing step of a 3D liquid crystal display device is as follows:

a first step of manufacturing a liquid crystal display panel by a conventional method;

a second step of forming a first transparent electrode having a grating structure on a base substrate on the light emitting side of the liquid crystal display panel by etching process; for example, a transparent electrode layer covering a surface of the base substrate is firstly formed and then a part of the transparent electrode layer is removed by etching, so that the first transparent electrode having a grating structure is formed;

a third step of grafting the cross-linking agent of binaphthol b and a liquid crystalline monomer a in a weight ratio of 3:2 as illustrated in FIG. 2 wherein n=6 and k=6 onto poly methyl hydrosiloxane c of m=4 so as to form side-chain polysiloxane liquid crystalline elastomers, uniformly mixing the resultant side-chain polysiloxane liquid crystalline elastomers, nano particles of ferroferric oxide, UV-polymerizable liquid crystalline monomer and photo-initiator in a weight percentage of 81.5%/8%/10%/0.5% and thus obtaining a mixture;

a fourth step of obtaining a mixture layer by applying a layer of the mixture obtained in the third step with a thickness of 0.4 μm on the first transparent electrode and then heating the mixture layer to a temperature of 70° C. so that the mixture layer forms a pitch of 340 nm and can reflect visible light having a wavelength of 540 nm, i.e., reflect green light; and irradiating the mixture layer through a mask plate (apertures of the mask plate corresponding to the first transparent electrodes) by UV light having an intensity of 5 mw/cm$^2$ so that the UV-polymerizable liquid crystalline monomer in the mixture layer is subject to cross-linking reaction to form a polymer network so as to stabilize the current pitch and then the mixture layer is cooled to room temperature and a first polymer layer is formed on the first transparent electrode by etching;

a fifth step of forming a mixture layer by further applying a layer of the mixture obtained in the third step with a thickness of 0.6 μm on the first polymer layer and then heating the mixture layer to a temperature of 85° C. so that the mixture layer forms a pitch of 265 nm and can reflect visible light having a wavelength of 420 nm, i.e., reflect blue light; and irradiating the mixture layer through a mask plate (apertures of the mask plate correspond with the first transparent electrodes) by UV light with an intensity of 5 mw/cm$^2$ so that the UV-polymerizable liquid crystalline monomer in the mixture layer is cross-linked to form a polymer network so as to stabilize the current pitch, and then the mixture layer is cooled to room temperature and forming a second polymer layer on the first polymer layer by etching;

a sixth step of covering the second polymer layer with a substrate having second transparent electrodes so as to form a display panel having a grating, wherein the second transparent electrodes face towards the second polymer layer and correspond with the second polymer layer, that is to say, the second transparent electrodes, the two polymer layers and the first transparent electrodes are laminated and are assembled with a backlight module to form a 3D display device.

At the room temperature, when no voltage is applied between the first transparent electrode and the second transparent electrode, the two polymer layers containing side-chain polysiloxane liquid crystalline elastomers are in glass state and the three-dimensional grating is in transparent state, then 2D display is performed. When a voltage is applied between the first transparent electrode and the second transparent electrode, the nano particles of ferroferric oxide in the polymer layers convert electromagnetic energy into heat energy so that the polymer layers is heated and the side-chain polysiloxane liquid crystalline elastomers are changed into cholesterol phase and have a fixed pitch after UV-polymerization. That is to say, the first polymer layer reflects green light, the second polymer layer reflects purple light, and thus all the light within the wavelength range of visible light are reflected, thereby achieving the effect of a grating and thus 3D display being performed. The first polymer layer has a thickness of 0.4 μm, and the second polymer layer has a thickness of 0.6 μm. Contrary to a liquid crystal grating having a thickness of dozens of millimeters in conventional art, the thickness of the grating is significantly reduced.

Embodiment Three

Steps for manufacturing a 3D liquid crystal display device are as follows:

a first step of manufacturing a liquid crystal display panel through a conventional method;

a second step of forming a first transparent electrode having a grating structure on a base substrate at the light emitting side of the liquid crystal display panel by etching process; for example, a transparent electrode layer covering surface of the base substrate is firstly formed and then a part of the transparent electrode layer is removed by etching, so that the first transparent electrode having a grating structure is formed;

a third step of grafting the cross-linking agent of binaphthol b and a liquid crystalline monomer a in a weight ratio of 1:1 as illustrated in FIG. 2 wherein n=8 and k=8 onto poly methyl hydrosiloxane c of m=10 so as to form side-chain polysiloxane liquid crystalline elastomers, uniformly mixing the resultant side-chain polysiloxane liquid crystalline elastomers, nano particles of ferroferric oxide, UV-polymerizable liquid crystalline monomer and photo-initiator in a weight percentage of 85.6%/6%/8%/0.4% and thus obtaining a mixture;

a fourth step of forming a mixture layer by applying a layer of the mixture obtained in the third step with a thickness of 0.8 μm on the first transparent electrode and then heating the mixture layer to a temperature of 70° C. so that the mixture layer has a pitch of 440 nm and can reflect visible light having a wavelength of 630 nm, i.e., reflect yellow light; and irradiating the mixture layer through a mask plate (apertures of the mask plate correspond with the first transparent electrodes) by UV light having an intensity of 5 mw/cm$^2$ so that the UV-polymerizable liquid crystalline monomer in the mixture layer is cross-linked to form a polymer network so as to stabilize the current pitch, and then the mixture layer is cooled to room temperature and obtaining a first polymer layer on the first transparent electrode by etching;

a fifth step of forming a mixture layer by further applying a layer of the mixture obtained in the third step with a thickness of 0.5 μm on the first polymer layer and then heating the mixture layer to a temperature of 80° C. so that the mixture layer has a pitch of 280 nm and can reflect visible light having a wavelength of 450 nm, i.e., reflect blue light; and irradiating the mixture layer through a mask plate (apertures of the mask plate correspond with the first transparent electrodes) by UV light having an intensity of 5 mw/cm$^2$ so that the UV-polymerizable liquid crystalline monomer in the mixture layer is cross-linked to form a polymer network so as to stabilize the current pitch and then the mixture layer is cooled to room temperature and obtaining a second polymer layer on the first polymer layer by etching;

a sixth step of covering the second polymer with a substrate having second transparent electrodes on the second polymer layer so as to form a display panel having a grating structure, wherein the second transparent electrodes face towards the second polymer layer and correspond with the second polymer layer, that is to say, the second transparent electrodes, the two polymer layers and the first transparent electrodes are laminated and assembled with a backlight module to form a 3D display device.

At the room temperature, when no voltage is applied cross the first transparent electrode and the second transparent electrode, the two polymer layers containing side-chain polysiloxane liquid crystalline elastomers are in glass state and the three-dimensional grating is in transparent state, then 2D display is performed. When a voltage is applied between the first transparent electrode and the second transparent electrode, the nano particles of ferroferric oxide in the polymer layers convert electromagnetic energy into heat energy so that the polymer layers is heated and the side-chain polysiloxane liquid crystalline elastomers are changed into cholesterol phase and have a fixed pitch after UV-polymerization. That is to say, the first polymer layer reflects yellow light, the second polymer layer reflects blue light, and thus all the light within the wavelength range of visible light are reflected and thereby the effect of a grating is achieved and thus 3D display is achieved. The first polymer layer has a thickness of 0.8 μm, and the second polymer layer has a thickness of 0.5 μm. Contrary to a liquid crystal grating having a thickness of dozens of millimeters in conventional art, the thickness of the grating is significantly reduced.

Contrary to the conventional liquid crystal gratings, the grating according to the embodiments of the present disclosure can be directly attached onto the light emitting side of the display panel, or the base substrate on the light emitting side of the display panel can be directly used as a first substrate of the grating. Therefore, the thickness of the display device is reduced. Since the polymer layers containing side-chain polysiloxane liquid crystalline elastomers used in the embodiments of the present disclosure further comprises nano-sized material for converting electromagnetic energy into heat energy, when a voltage is applied, the polymer layers is heated so that the side-chain polysiloxane liquid crystalline elastomers are changed into cholesterol phase from glass state. The liquid crystalline elastomers among at least two polymer layers in cholesterol phase can reflect all the light within the wavelength range of visible light and thus can obtain a structure of the barrier fence type grating and 3D display is achieved. Since the side-chain polysiloxane liquid crystalline elastomers can reflect the visible light of all the wavelengths as the temperature changes, various polymer layers which can reflect all the light within the range of visible light can be obtained by adjusting heating temperature and contents of the components of the mixture (for example, under the same temperature, if the content of the side-chain polysiloxane liquid crystalline elastomers in the mixture layer is different, the pitch of the polymer layer formed is different and thus the reflected wavelength is different), so that reflected wavelength and the thickness of the polymer layer can be better controlled.

The foregoing are merely exemplary embodiments of the disclosure, but are not used to limit the protection scope of the disclosure. The protection scope of the disclosure shall be defined by the attached claims.

The present disclosure claims priority of Chinese Patent Application No. 201510125758.2 filed on Mar. 20, 2015, the disclosure of which is hereby entirely incorporated by reference.

The invention claimed is:

1. A grating, comprising:
a first substrate and a second substrate which are oppositely disposed;
a first transparent electrode which has a grating structure and is disposed on a side of the first substrate facing towards the second substrate;
a second transparent electrode which is disposed on a side of the second substrate facing towards the first substrate and corresponds to the first transparent electrode; and
a polymer layer which is disposed between the first transparent electrode and the second transparent electrode and which contains therein nano-sized material configured to converting electromagnetic energy into heat energy and liquid crystalline elastomers;
wherein where a voltage is applied between the first transparent electrode and the second transparent electrode, the nano-sized material converts electromagnetic energy into heat energy, so that the polymer layer is in cholesterol phase and reflects all the light within the wavelength range of visible light, and where a voltage is not applied between the first transparent electrode and the second transparent electrode, the polymer layer is in transparent state.

2. The grating according to claim 1, wherein the nano-sized material is nano particles of ferroferric oxide or nano rods of ferroferric oxide.

3. The grating according to claim 1, wherein the nano-sized material has a weight percentage of 1%-10% in the polymer layer.

4. The grating according to claim 1, wherein the grating comprises at least two polymer layers, the liquid crystalline elastomers are side-chain polysiloxane liquid crystalline elastomers, the cholesterol phases of the at least two polymer layers reflect all the light within the wavelength range of visible light.

5. The grating according to claim 4, wherein each polymer layer has a thickness of 0.2-1.0 micron.

6. The grating according to claim 4, wherein each polymer layer further comprises UV-polymerizable liquid crystalline monomer and photo-initiator, the UV-polymerizable liquid crystalline monomer is polymerized into a polymer network by a photo-initiating action of the photo-initiator.

7. The grating according to claim 6, wherein each polymer layer comprises the side-chain polysiloxane liquid crystalline elastomers having a weight percentage of 69%-96.9%, the UV-polymerizable liquid crystalline monomer having a weight percentage of 2%-20%, and the photo-initiator having a weight percentage of 0.1%-1%.

8. The grating according to claim 6, wherein the UV-polymerizable liquid crystalline monomer is 1,4-bis(4-(6'-propenyloxy hexyloxy) benzoyloxy) -2-toluene, and the photo-initiator is benzoin dimethyl ether.

9. The grating according to claim 4, wherein the side-chain polysiloxane liquid crystalline elastomers are obtained by grafting a liquid crystalline monomer as illustrated in Formula I and a cross-linking agent as illustrated in Formula II onto poly methyl hydrosiloxane as illustrated in Formula III:

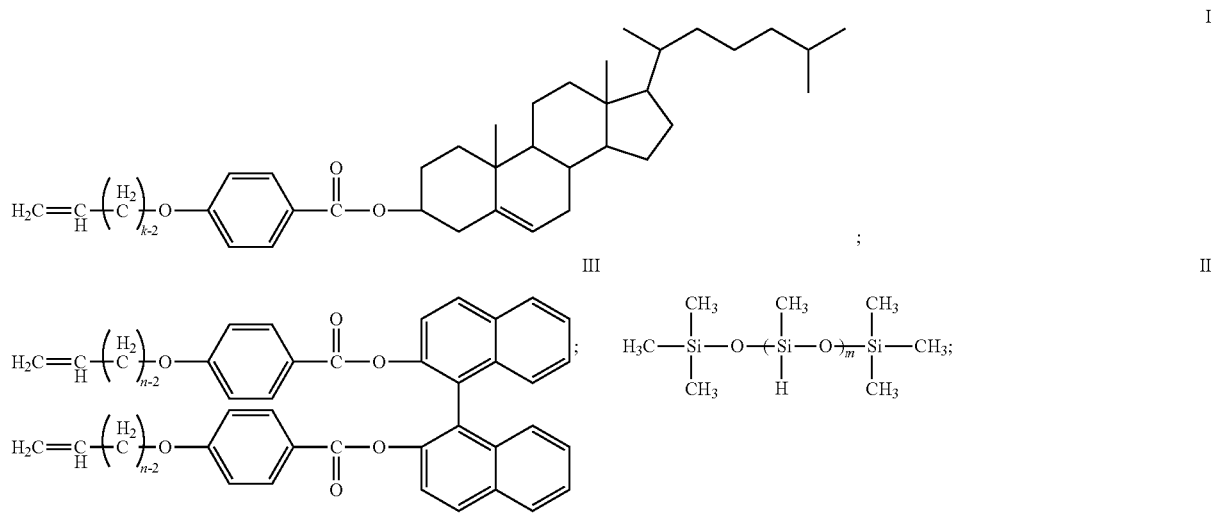

wherein k in Formula I is an integer selected from 3 to 10, n in Formula II is an integer selected from 3 to 10, and m in Formula III is an integer selected from 4 to 30.

10. The grating according to claim 9, wherein the liquid crystalline monomer as illustrated in Formula I and the cross-linking agent as illustrated in Formula II have a mol ratio of 1:9~9:1.

11. The grating according to claim 4, wherein the grating has two polymer layers, which reflect green light and purple light respectively, or which reflect yellow light and blue light respectively.

12. A display device comprising a display panel and the grating according to claim 1, wherein the grating is disposed on a light emitting side of the display panel.

13. The display device according to claim 12, wherein the first substrate of the grating is a base substrate on the light emitting side of the display panel.

14. A manufacturing method of a grating, comprising:
forming a first transparent electrode and a second transparent electrode respectively on a first substrate and a second substrate, the first transparent electrode and the second transparent electrode being disposed correspondingly;
forming a polymer layer on the first transparent electrode; and cell-assembling the first substrate and the second substrate;

wherein the polymer layer contains nano-sized material configured to convert electromagnetic energy into heat energy and liquid crystalline elastomers; where a voltage is applied between the first transparent electrode and the second transparent electrode, the nano-sized material converts electromagnetic energy into heat energy so that the polymer layer is in cholesterol phase and reflects visible light of all wavelengths; where no voltage is applied between the first transparent electrode and the second transparent electrode, the polymer layer is in transparent state.

15. The manufacturing method according to claim 14, wherein the polymer layer comprises at least two polymer layers, the liquid crystalline elastomers are side-chain polysiloxane liquid crystalline elastomers, and the cholesterol phases of the at least two polymer layers reflect all the light within the wavelength range of visible light.

16. The manufacturing method according to claim 15, wherein forming two polymer layers on the first transparent electrode comprises:

Step a. applying a mixture layer containing the side-chain polysiloxane liquid crystalline elastomers, the nano-sized material, the UV-polymerizable liquid crystalline monomer and the photo-initiator onto the first transparent electrode;

Step b. heating the mixture layer to a first temperature so that the side-chain polysiloxane liquid crystalline elastomers form a first pitch;

Step c. irradiating the mixture layer having the first pitch by UV light through a mask plate having apertures corresponding to the first transparent electrode, so that the UV-polymerizable liquid crystalline monomer forms a polymer network to stabilize the first pitch and can reflect light of the first wavelength, and cooling the mixture layer to room temperature and forming a first polymer layer by etching;

Step d. applying a second mixture layer on the first transparent substrate formed with the first polymer layer having the first pitch;

Step e. adjusting the first temperature in the Step b to a second temperature and repeating the Step c to form a second polymer layer having a second pitch and reflecting light of a second wavelength.

17. The manufacturing method according to claim 16, wherein at least three polymer layers having different pitches are obtained by adjusting the first temperature in the Step b and repeating the Step a to the Step c at least once.

18. The manufacturing method according to claim 16, wherein the mixture layer comprises the side-chain polysiloxane liquid crystalline elastomers having a weight percentage of 69%-96.9%, the nano-sized material having a weight percentage of 1%-10%, the UV-polymerizable liquid crystalline monomer having a weight percentage of 2%-20%, and the photo-initiator having a weight percentage of 0.1%-1%.

19. The manufacturing method according to claim 16, wherein the polymer layer comprises two polymer layers, the first pitch is 150-5000 nm, and the second pitch is 150-5000 nm.

20. The manufacturing method according to claim 16, wherein the polymer layer comprises two polymer layers, the first temperature is 30-120° C., and the second temperature is 30-120° C.

* * * * *